July 19, 1938.　　　　L. A. MALLETT　　　　2,124,166
REAR DRIVE MOTOR VEHICLE
Filed Nov. 6, 1934　　　3 Sheets-Sheet 3

INVENTOR
Lloyd A. Mallett
BY
ATTORNEY

Patented July 19, 1938

2,124,166

UNITED STATES PATENT OFFICE 2,124,166

REAR-DRIVE MOTOR VEHICLE

Lloyd A. Mallett, Seattle, Wash., assignor to Kenworth Motor Truck Corporation, Seattle, Wash., a corporation of Washington Application November 6, 1934, Serial No. 751,723

13 Claims. (Cl. 180—54)

This invention relates to rear-drive motor vehicles and more especially is directed to that character of vehicle in which the motor is mounted to the rear of the differential assembly, the object, generally stated, being the provision of an especially efficient and relatively simplified structural arrangement so designed as to eliminate the difficulties heretofore encountered in vehicle constructions directed toward a similar end.

More especially in connection with avoiding the disadvantages of prior developments in this field, it is a particular object of my invention to provide an arrangement wherein the motor of the assembly is mounted in a plane above that of the differential housing and in a fore-and-aft disposition on or near the center line of the vehicle to equalize the distribution of weight and prevent momentum-influenced washing of the lubricating oil from the suction pump of the motor.

It is a further and particular object of the invention, power being transmitted from the motor by means of a train of drop gears, to locate such gear train in a manner whereby the gears handle the engine torque only, the transmission being interposed between the delivery end of the gear train and the differential. The arrangement further operates to reduce the over-all length of the vehicle body and permits an especially efficient and direct power take-off from each of the drop gears to the several engine accessories such as generator, air compressor, and air-circulating fan, each of which accessories is as a result inoperative only when the motor clutch is disengaged.

A further object still is the provision of an assembly accommodating use of a conventional transmission which I mount to locate the main and counter shafts of the same on an approximately horizontal plane common to each shaft, the gear-shift cover being disposed laterally as respects the transmission housing with the road clearance of the vehicle being increased and allowing use of mechanical gear-shifting devices as distinguished from the electric-shift and air-shift mechanism heretofore necessarily employed.

It is a still further and particular object to provide an especially efficient air-circulating system designed to minimize the admission of road dust with its resulting clogging of the screened air admission and discharge openings.

A still further and particular object is the provision of an especially advantageous mounting for the motor and the related clutch, drop gears, transmission, and accessories allowing the entire assembly to be removed as a unit from the vehicle.

Further objects and advantages will, together with the foregoing, become apparent in the course of the following detailed description and claims, the invention consisting in the novel construction, adaptation and combination of parts hereinafter described and claimed.

In the drawings:—

Figure 1:
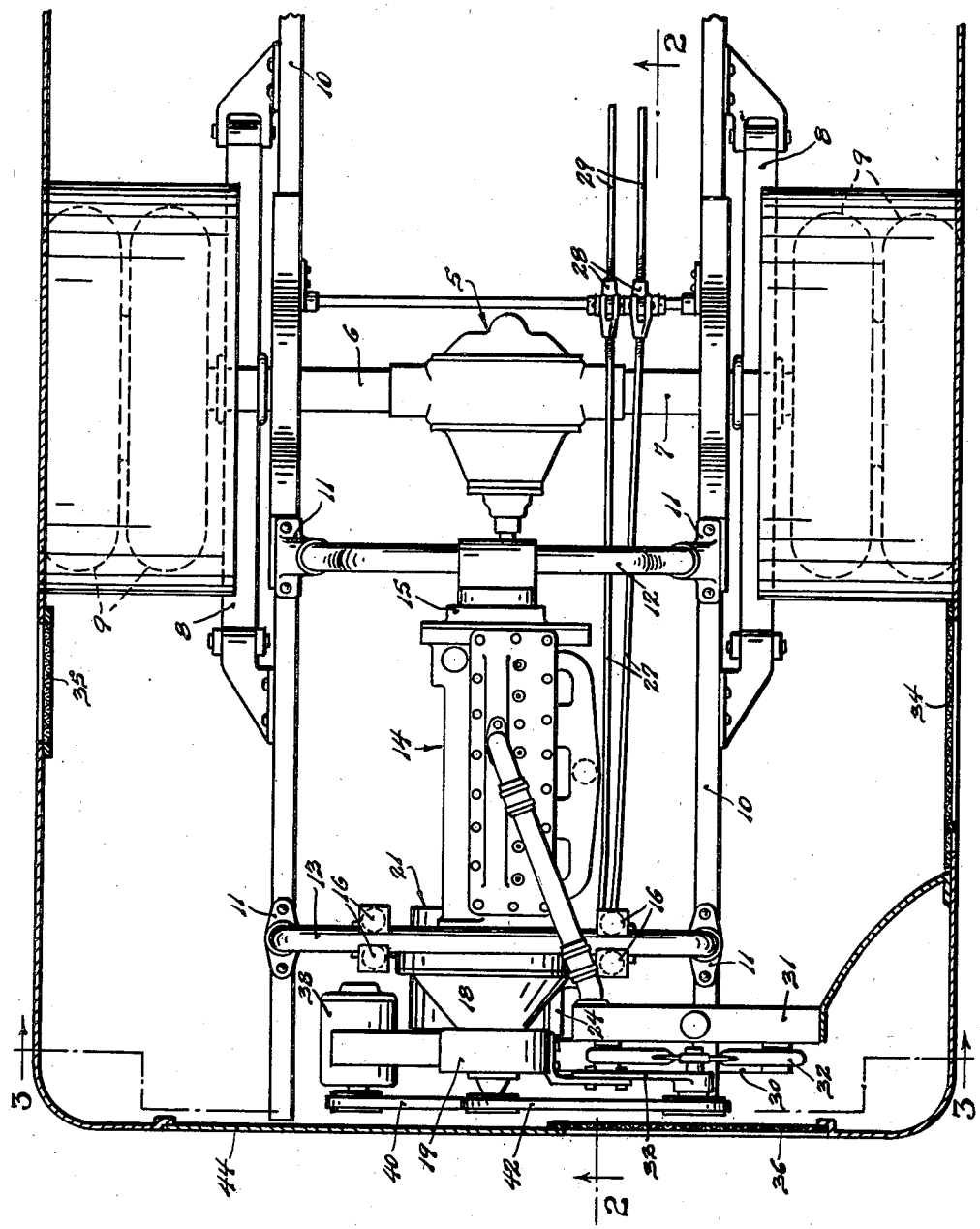
Figure 1 is a top plan view of the structure constituting the preferred embodiment of the invention, the vehicle chassis being broken away and the side walls of the body shown in horizontal section with the dust shield underlying the motor assembly being deleted.
Figure 2:
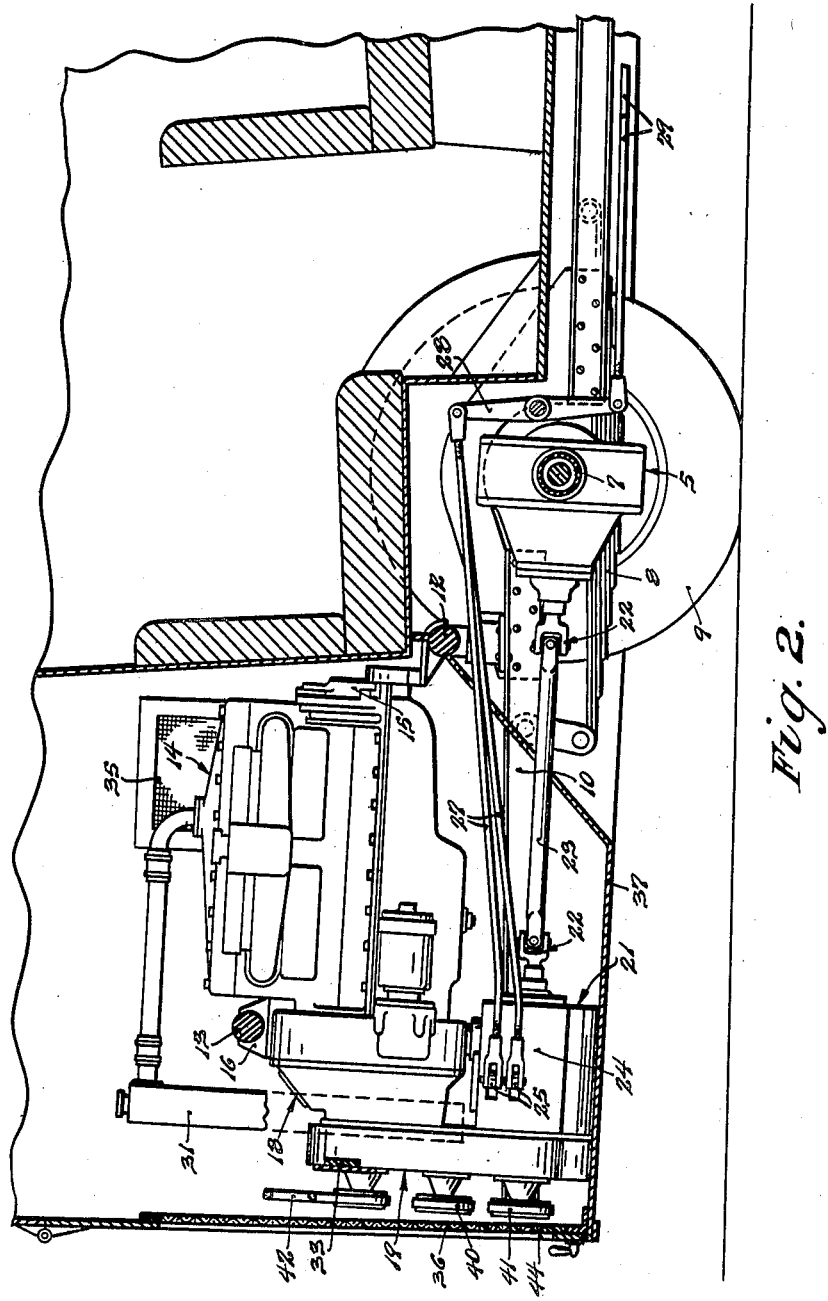
Fig. 2 is a longitudinal vertical section taken on the line 2—2 of Fig. 1, a portion of the radiator being broken away and shown in dotted lines.

The vehicle shown in the drawings is of the passenger-bus character, the rear seat of which overlies the differential housing indicated by the numeral 5. Tubular extensions 6 and 7 from the differential housing receive the drive axles to the rear wheels 9 and are coupled to the vehicle springs 8 which in turn are connected with the vehicle frame. Said frame is indicated as being composed of longitudinally extending channels 10 having an arched kick-up extending over the axle housings, the channels being connected forwardly of the differential housing by suitable cross bolstering.

Rearwardly of said differential housing and boltably secured over the frame channels 10, I provide socket members 11 arranged in transversely aligned longitudinally spaced pairs to receive a forward U-shaped tubular bolster member 12 and a rear U-shaped tubular bolster member 13, the horizontal extension of the former lying relatively in proximity of but above the upper level of the differential housing and that of the latter being spaced thereabove to operate in conjunction to support a motor such as indicated by 14 between the same. The front mounting for said motor is of the conventional truck type, comprising an annular box formed on the timing gear cover 15 and fitting in a collar which is fast to the bolster member 12, the rear mounting comprising lugs 16 connected with the bolster member 13 at opposite sides of the longitudinal center line of the vehicle and coacting with hangers 17 which connect with the opposite sides of the clutch housing 18 at the rear of the motor. A three point suspension locating the motor in a fore-and-aft position on the longitudinal center of the vehicle is afforded, removal of the bolts connecting the sockets 11 for the rear bolster enabling the motor together with the bolster member 11 to be drawn from the rear of the coach.

Figure 3:
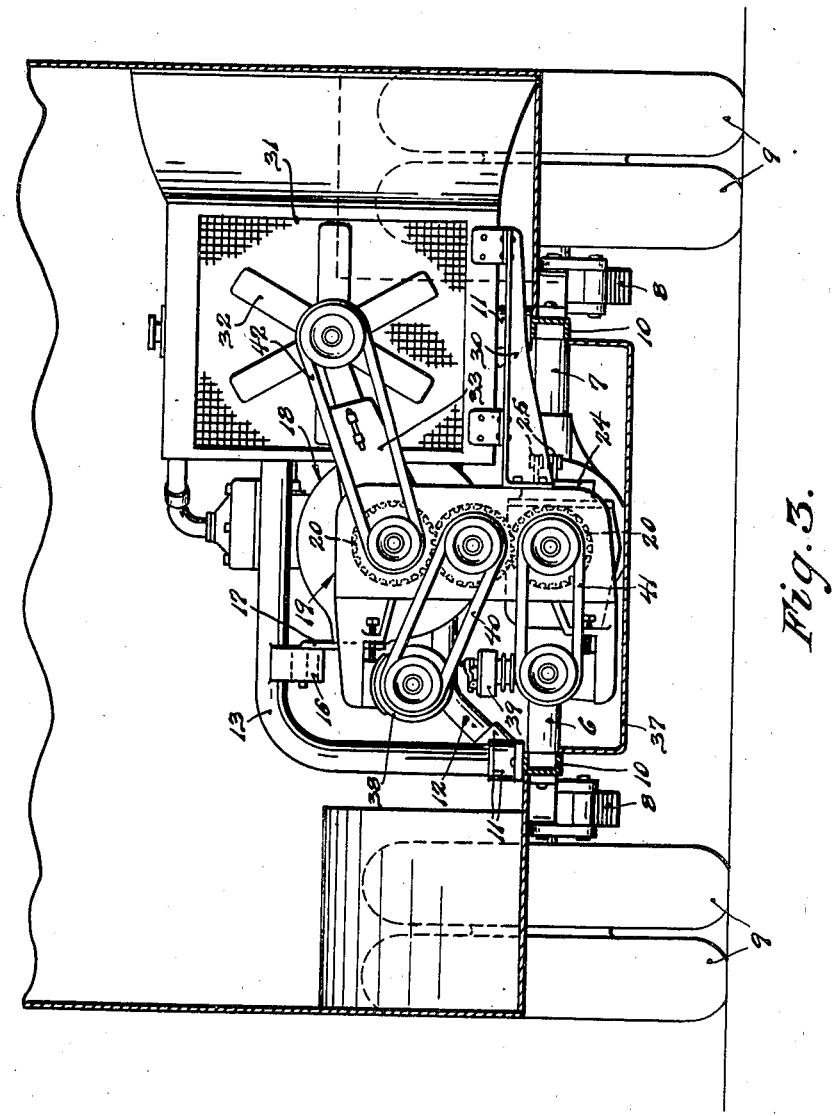
Fig. 3 is a transverse vertical section taken on the line 3—3 of Fig. 1.

At the rear end of the motor and secured to the clutch housing is a casing 19 for a train of helical drop-gears 20 (indicated by dotted lines in Fig. 3), the upper gear of said train connecting with the delivery plate of the clutch and the lower gear having operative connection with the gears of a transmission assembly, the housing for which is indicated at 21. Said housing 21, extending forwardly from the gear case 19 and being located in the approximate horizontal plane of the differential housing 5, is secured to the gear case and preferably also connects with the lower side of the clutch housing. The torque shaft connecting the transmission with the differential is indicated at 23, conventional universals therefor being shown at 22.

More particularly as respects the transmission, the same is conventional insofar as the gear structure and housing are concerned, being mounted, however, on its side to locate the main and counter shafts in relative horizontal alignment with the gear-shift cover 24 in a lateral disposition as respects the transmission housing. Extending from the transmission and projecting through the shift cover are a pair of levers 25 each of which is movable longitudinally through the instrumentality of companion rods 27 connecting by levers 28 with respective control rods 29 leading to the forward end of the vehicle and operated by a gear-shift lever accessible to the driver. Any suitable or desired mechanism is employed in the operation of the clutch.

The cooling system of the motor comprises a radiator 31 offset from the gear case 19 and supported thereby through the medium of a bracket 30, said radiator having hose connection with the water jackets of the motor. Circulation of air is influenced by a fan 32 supported to the rear of the radiator by an adjustable bracket 33, screened air admission openings 34 and 35 being located in the opposite side walls of the coach body with the discharge opening 36 being formed in a door 44 at the rear of the coach, said door being hinged at its upper end to render the motor assembly accessible. A suitable shield 37 below the motor and the related parts of the assembly seals the same against the admission of road dust.

Motor accessories such as a generator and air compressor are indicated at 38 and 39. Pulleys thereon co-act with pulleys fast to the shafts of the successive drop gears to receive drive belts 40 and 41, a similar drive to the fan 32 comprising a belt 42.

The structural formation and arrangement of the several parts of the assembly is believed clear. I have, however, illustrated and described the invention in its preferred embodiment and it is my intention that the same be limited only by the scope of the hereto annexed claims.

What I claim, is:—

1. In a rear-drive motor coach, in combination with the rear axle assembly including a differential, a motor supported in a plane above that of the differential and extending rearwardly therefrom, a transmission located below the motor in the approximate horizontal plane of the differential, connection from the motor to the transmission and from the transmission to the differential for transmitting power through the transmission to the differential, and means for controlling said transmission comprising longitudinally movable lever arms extending laterally from the transmission and mechanical means engaging the lever arms and extending therefrom to the forward end of the vehicle for shifting the lever arms.

2. In a rear-drive motor vehicle, in combination with the rear axle assembly including a differential, a motor supported on the approximate longitudinal median line of the vehicle rearwardly of and in a plane above the horizontal plane of the differential, change-gear mechanism disposed below the motor in the approximate horizontal plane of the differential, a train of drop gears rearwardly of said motor and the change-gear mechanism connecting the motor with the change-gear mechanism, a torque shaft including universals connecting the change-gear mechanism with the differential, and means for controlling the change-gear mechanism.

3. In a rear-drive motor vehicle, in combination, a rear axle assembly including a differential, a vehicle frame supported over said rear axle assembly, a power plant supported by the vehicle frame to locate the same above the horizontal plane occupied by the differential, change-gear mechanism supported below the motor in the approximate horizontal plane of the differential, a torque shaft including universals connecting the change-gear mechanism with the differential, and means for transmitting the power of the power plant through the change-gear mechanism to the torque shaft.

4. In a rear-drive motor vehicle including a driven rear axle, a power plant and accessories therefor mounted to the rear of said axle, a train of gears operating to transmit power from the power plant to the rear axle, and means for driving the accessories of said power plant comprising belts driven from the gears of said train.

5. In a rear-drive motor vehicle, in combination with the rear axle assembly including a differential and a horizontally disposed torque shaft extending rearwardly from the differential, a motor supported in a horizontal plane above that occupied by the torque shaft, change-gear mechanism supported below the motor and connecting with the torque shaft, a motor clutch, a train of drop gears extending from the clutch to the change-gear mechanism, a plurality of motor accessories, and connection from the gears of said train to the motor accessories for driving the same.

6. In a rear-drive motor vehicle, in combination with the rear axle assembly including a differential and a torque shaft therefor extending rearwardly from the differential, a motor and accessories therefor mounted to the rear of the rear axle, a train of gears operatively connecting the motor and torque shaft, and connection from the gears of said train to the accessories for driving the same.

7. In a rear-drive motor vehicle, in combination with the rear axle assembly including a differential and a torque shaft therefor extending rearwardly from the differential, a motor and accessories therefor mounted to the rear of the rear axle assembly, a transmission also mounted to the rear of the rear axle assembly having drive connection with the torque shaft, a gear driven by the drive shaft of the motor and a gear driven thereby having drive connection with the transmission, and connection from each of said gears to an accessory for driving the accessories.

8. In a motor vehicle, in combination with a driven axle assembly including a differential and a torque shaft for driving the differential, a motor and accessories therefor, a gear driven by the drive shaft of the motor and a gear driven thereby having drive connection with the torque shaft, and connection from each of said gears to an accessory for driving the accessories.

9. In a rear-drive motor vehicle, in combination with the live axle and the associated differential, a torque shaft having operative connection with the differential, a motor supported in off-set relation to the torque shaft with the power-output end of the drive shaft thereof disposed farthest remote from the axle, a plurality of motor accessories, means by which power is transferred laterally operatively associated with the off-set torque shaft and with the motor for driving the torque shaft from said remotely disposed power-output end of the motor drive shaft, and means driven from said lateral transfer means and connected with the motor accessories for driving the accessories.

10. In a motor vehicle providing a live axle, an associated differential, and a power plant supported to lie in angular relation to the axle with the power-output end of the drive shaft thereof farthest remote from said axle, the combination therewith of a motor-driven torque shaft operatively connected with the differential and disposed in off-set relation to the drive shaft of the power plant, and a motor-driven air-circulating fan, both the fan and the torque shaft being driven from the same end of the motor drive shaft.

11. In combination with the live axle and associated differential of a motor vehicle, a power plant supported to lie in angular relation to the axle with the power-output end of the drive shaft thereof farthest remote from the axle, a transmission housing supported to lie in off-set relation to the power plant and located such that the power-output end of the change-gear mechanism housed thereby lies in opposite relation to the drive shaft of the power plant, thereby locating both the power-output end of the drive shaft and the power-receiving end of the change-gear mechanism at the end of the assembly farthest remote from the axle, motor accessories, lateral transfer mechanism connecting said power-output end of the drive shaft with the power-receiving end of the change-gear mechanism and with the accessories, and a torque shaft having universal connection both with the change-gear mechanism and with the differential and lying in co-axial relation to the power-output end of the former for driving the differential.

12. In a rear-drive motor vehicle, in combination with the live rear axle and a differential associated therewith, a power plant supported to lie in a plane approximately at right angles to and to the rear of said rear axle with its power-output end farthest remote from the axle, change-gear mechanism supported to lie in off-set approximately parallel relation to the motor with its power-output end directed oppositely to that of the motor, driving connection from said rear or power-output end of the motor to said rearwardly disposed power-receiving end of the change-gear mechanism, connection including universals from the forward or power-output end of the change-gear mechanism to the differential, a motor compartment formed to the rear of said rear axle for encasing the motor and the related mechanism by which power is transmitted to the differential, and means by which air is caused to pass through said compartment for cooling the motor.

13. The structure as defined in claim 12 and associated means by which the change-gear mechanism is manually controlled from the forward end of the vehicle.

LLOYD A. MALLETT.